United States Patent Office 2,758,501
Patented Aug. 14, 1956

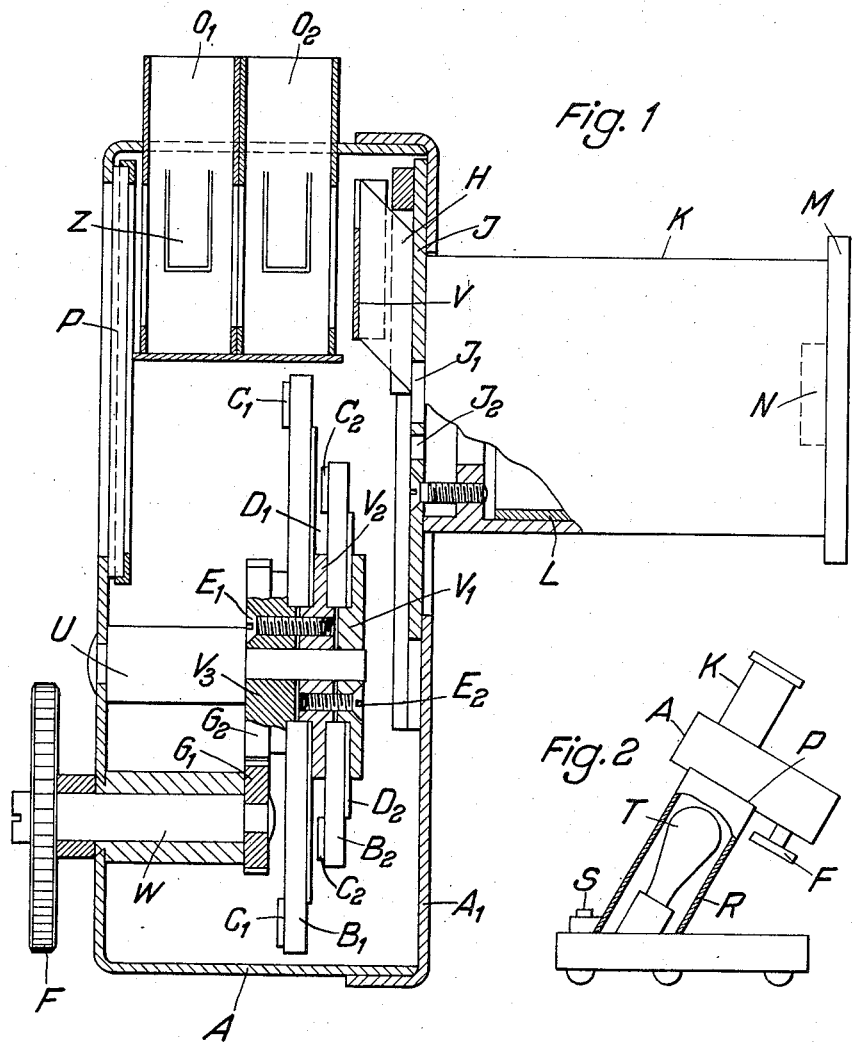

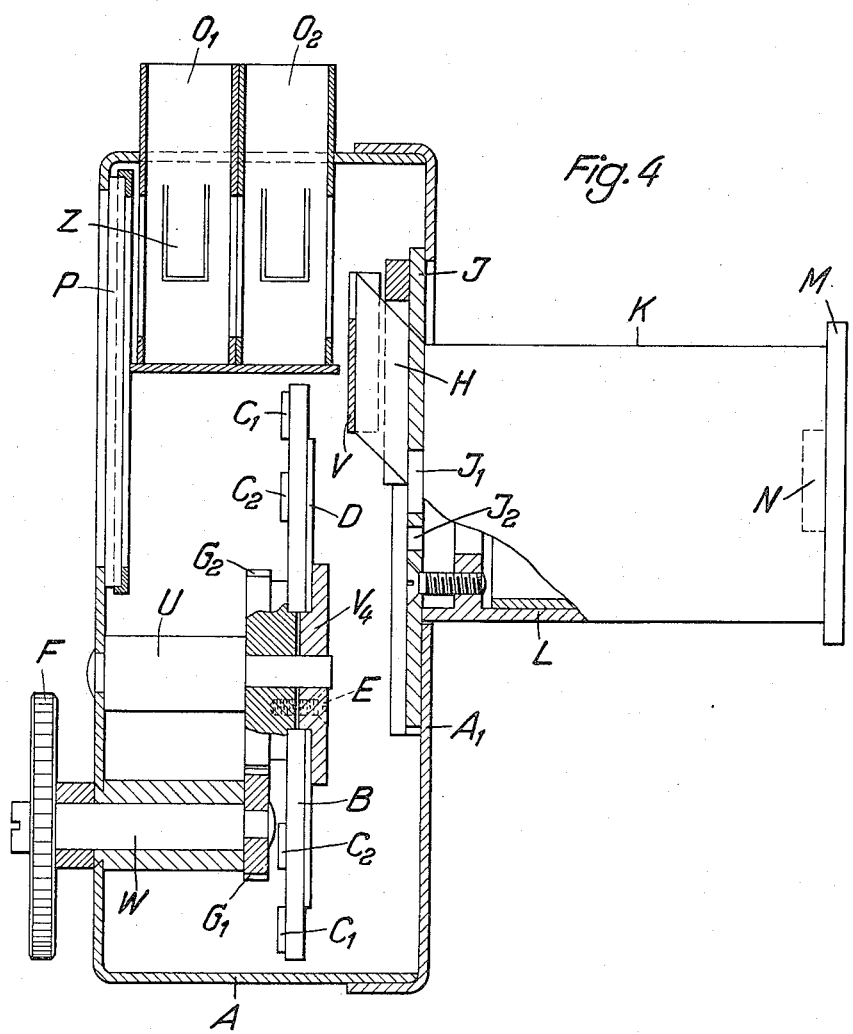

2,758,501

COLORIMETER FOR DIFFERENT MEDICAL INVESTIGATIONS

Erich Kallmeyer, Berlin, and Otto Will, Munich, Germany

Application March 10, 1952, Serial No. 275,834

Claims priority, application Germany March 16, 1951

4 Claims. (Cl. 88—14)

For making medical investigations basing on the comparison of the value of two colors the physician has to procure different apparatus. Thus, he requires the haemometer for ascertaining the contents of haemoglobin and the blood-sugar colorimeter for the appointment of the blood-sugar speculum.

The mentioned two apparatus are provided with equal optics by which the physician determines the equal value of the color of a "color key" and the liquid to be examined. By the expression "color key" the specialist means a rotatable disc to which a color and its toning down are applied and which is provided with a graduation. To each degree of coloring a certain value of graduation is associated. By turning the disc so far that, according to the opinion of the physician observing the colors by the optics, a certain degree of coloring conforms with the color of the liquid to be examined a certain graduation value results which may be used for the diagnosis. The optics of the individual apparatus are very expensive.

According to the invention such high expenses are avoided by providing a universal colorimeter for entirely different medical investigations, said colorimeter comprising more than one, at least two "color keys," the one of which is to be used for one kind of investigations and the other for another kind. Therefore, the physician may make two entirely different investigations with one and the same apparatus, he may ascertain the contents of haemoglobin as well as he may appoint the blood-sugar speculum.

Apparatus are already known in which not only one, but two "color keys" are used for the reason that the colors to be compared comprise a long series of degrees of coloring which, corresponding to the constructional conditions, may be provided on one "color key" or, by dividing the latter on two "color keys." It is however impossible to make two entirely different investigations with such apparatus.

The drawings show by way of example two embodiments of the invention.

Fig. 1 is a schematical cross section through an apparatus according to the first embodiment of the invention, Fig. 2 is a side view of the colorimeter in a diminished scale.

Fig. 4 is a cross section through the embodiment of Fig. 3 in which the slidably mounted optical system is shown in its other adjusted position.

Figure 3:
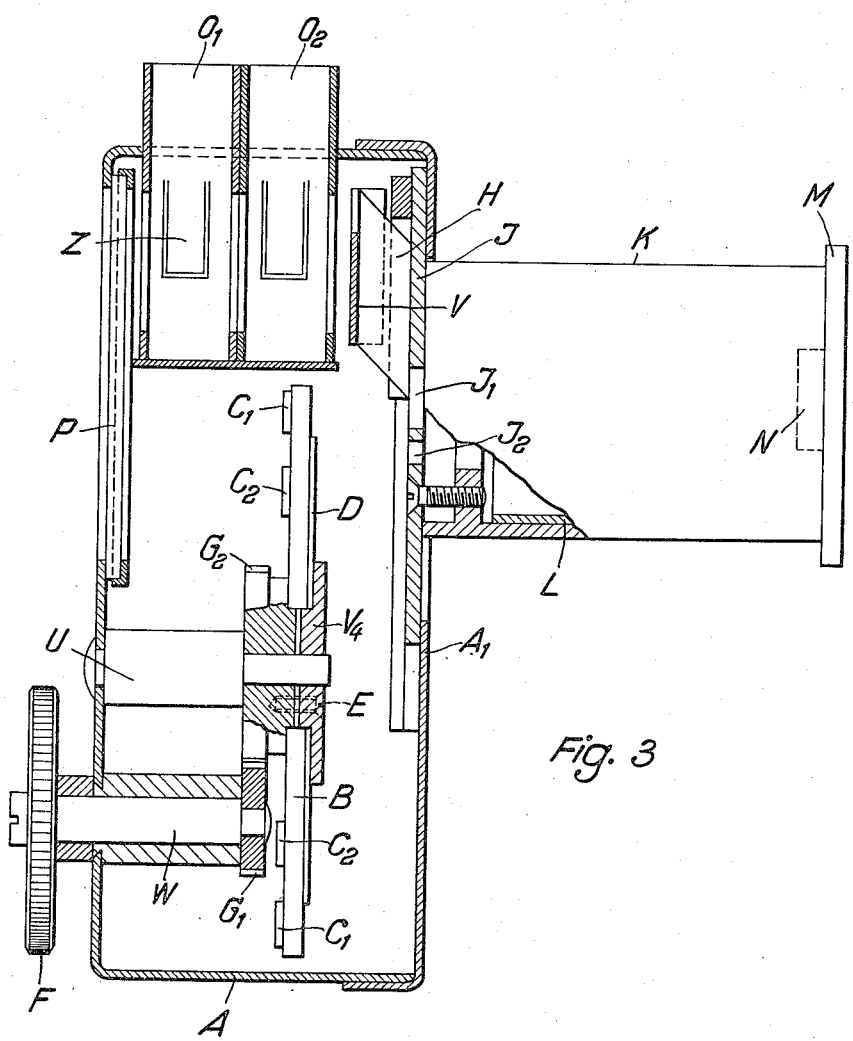
Fig. 3 is a cross section through another embodiment of the invention, similar to Fig. 1. The side view shown in Fig. 2 is simultaneously a side view of Fig. 3.

The round casing A of the apparatus provided with the eyepiece K may rest on a support R provided with a base plate as shown in Fig. 2. If it is desired to avoid the oscillating or fluctuating daylight which influences unfavorably the result of the investigations, the use of a colorimeter according to Fig. 2 is recommended. In the tube R of four-edged cross section, carrying the apparatus an electric lamp T is arranged below an opal glass plate P for the purpose of producing diffused light. It is important that the electric lamp T is only switched on during the investigation as the "color keys" $C^1$, $C^2$ may be damaged by the heat developed if the lamp is alight for a longer time. Therefore, the investigator must close the push button switch S during the investigation for switching on the lamp. The switch S is arranged at the bottom plate of the tube R. If he leaves the current circuit of the lamp T is interrupted by release of the switch S.

As in the known colorimeters the test-liquid is filled into a tube of four-edged cross section. Now, there are cases in which the color of the test-liquid is very clear so that it is very difficult to compare it with the "color-key." By providing two tubes $O_1$ and $O_2$ in the apparatus one beside the other as shown in Figs. 1 and 3, the color to be examined becomes darker and may be easier ascertained. The average graduation value is then halved for the solution. It also may happen that the test-liquid is very dark, a fact which is also unfavourable for ascertaining the value. In this case the dark liquid is to be halved. This is done by means of a glass plate which is of such thickness that it takes up the half of the thickness of tube $O_1$ or $O_2$ if it is inserted lengthwise in one of the two tubes so that only the other half of the tube can be occupied by the dark liquid. The light passed through is doubled, accordingly the reading in dependence on the light sent through must be halved. The two glass tubes $O_1$ and $O_2$ of four-edged cross section arranged side by side are positioned vertically in the casing A so that no liquid may escape and they are kept springily as indicated at Z.

In the embodiment according to Fig. 1 the two "color-keys" $C^1$ and $C^2$ arranged in the casing A side by side are rotatably supported. They are fastened at the lower surfaces of the rims of two annular glass plates $B^1$ and $B^2$. The glass plate $B^1$ has a greater diameter than the glass plate $B^2$. On the upper surfaces of the glass plates $B^1$ $B^2$ annular discs consisting of Celluloid and containing the graduations $D_1$ and $D_2$ are fixed. The inner edges of the two annular glass plates $B_1$ and $B_2$ with the graduations $D_1$ and $D_2$ are clamped between the discs $V_1$, $V_2$ and $V_2$, $V_3$ respectively so that by loosening the screws $E_1$ and $E_2$ the graduations $D_1$ and $D_2$ may be displaced on the glass plates $B_1$ and $B_2$. The entire unit is supported by a pivot U and may be rotated by means of a hand wheel F fixed at the one end of a shaft W supported by the casing in any suitable way. At the other end of said shaft a pinion $G_1$ is fastened engaging a gear wheel $G_2$ provided on the disc $V_3$. By rotating the "color-keys" $C_1$ and $C_2$ the physician may ascertain the color value of the test-liquid as will be described hereafter. The diameter of the glass discs carrying the "color-keys" may be greater than up to now so that the individual degrees of coloring may be stretched out over a greater space and may be better compared.

Of course a greater number of "color-keys" may be used in the manner described and they may be exchangeable. For this purpose it is only required to remove the cover $A_1$ of the casing A together with the eye-piece K.

In contradistinction to the embodiment shown in Fig. 1 the apparatus according to Fig. 3 has only one annular glass plate B at the lower surface of which both "color-keys" $C_1$ and $C_2$ are fixed. At the upper surface of the glass plate B a disc D consisting of Celluloid is arranged carrying the respective graduations. As described with regard to the first embodiment the glass plate B is clamped between the disc $V_4$ and the gear wheel $G_2$, so that the graduation disc D may be displaced relatively to the glass plate B by loosening the screw E. The rotation of the glass plate B for the purpose of ascertaining the color value of the test-fluid is effected in the same manner as with the embodiment according to Fig. 1.

In both embodiments of the invention shown in Figs. 1 or 3 respectively the optics, known per se, consist of the outer tube K, the inner tube L with the eye-piece mounting M provided with the lens N. A plate J connected with the outer tube K by screws carries a rhombic prism H. By moving the tube K provided with the eye-piece upwardly or downwardly the prism may be adjusted into two different positions. In the upper position shown in Figs. 1 and 3 the physician compares the "color-key" $C_1$ with the test-liquid in the two glass tubes $O_1$, $O_2$ arranged side by side. If the eye-piece is moved downward by the physician (Fig. 4) the "color-key" $C_1$ is covered by the opaque plate V so that the physician may only compare the "color-key" $C_2$ with the test-liquid as the diffused light flowing from the lamp T through the opal glass plate P may reach the optics through the opening $J_1$ of the plate J from the "color-key" $C_2$, while in the upper position of the eye-piece shown in Figs. 1 and 3 the diffused light from the "color-key" $C_2$ cannot reach the optics.

By means of the upper opening $J^1$ of the slidable plate J, according to Figs. 1 and 3, the physician can observe the colored wedge $C^1$, while through the lower opening $J^2$ he can read the corresponding graduations.

Since, as shown in Fig. 4, the plate J with the optical system is displaced downwardly to its other adjusted position, the colored wedge $C^1$ is covered by the opaque plate V. In this position of the optical system, the physician can observe the colored wedge $C^2$ through the opening $J^1$ while through the lower opening $J^2$ he can read the graduations.

What we claim is:

1. In a colorimeter for different medical investigations of liquids, the combination of a casing; at least two, transparent containers for liquids, removably mounted in said casing; an observation means so slidably mounted in said casing for vertical movement as to afford constant observation of the liquids in said containers; a rotatable shaft journaled in said casing; at least two, transparent color keys so mounted on said shaft as to be observed separately by means of said observation means when said means is in each of two adjusted positions, respectively; a lamp associated with said casing and adapted to pass light rays simultaneously through said containers and said color keys; and an opaque plate so mounted on said observation means as to be slidable therewith, and having an aperture so disposed in said plate as to permit observation, by use of said observation means, of each of said color keys when said observation means is slid into each of said two adjusted positions, respectively.

2. A colorimeter, according to claim 1, in which each of said color keys comprises a colored portion and a graduation.

3. A colorimeter, according to claim 1, in which a transparent disc is provided for each of said color keys, said discs being mounted on said shaft, and said color keys being radially spaced relative said shaft.

4. A colorimeter, according to claim 1, in which a transparent disc is mounted on said shaft, and said color keys are mounted on said disc in radially spaced relation to said shaft.

References Cited in the file of this patent

UNITED STATES PATENTS

| | | |
|---|---|---|
| 1,707,717 | Exton | Apr. 2, 1929 |
| 2,196,234 | Townsend | Apr. 9, 1940 |
| 2,386,878 | Nickerson | Oct. 16, 1945 |

FOREIGN PATENTS

| | | |
|---|---|---|
| 15,678 | Great Britain | July 4, 1912 |
| 15,475 | Great Britain | July 4, 1913 |
| 299,194 | Great Britain | Oct. 25, 1928 |